Feb. 2, 1971  H. L. JONES  3,560,089
PLATEN COVER

Filed July 26, 1968  4 Sheets-Sheet 1

INVENTOR.
HUGH L. JONES
BY
ATTORNEYS

Feb. 2, 1971 — H. L. JONES — 3,560,089
PLATEN COVER
Filed July 26, 1968 — 4 Sheets-Sheet 2
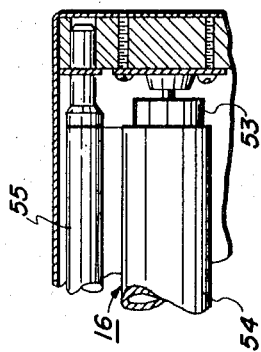
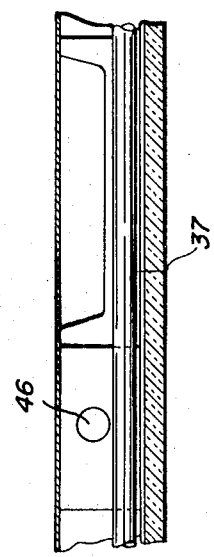
FIG. 2
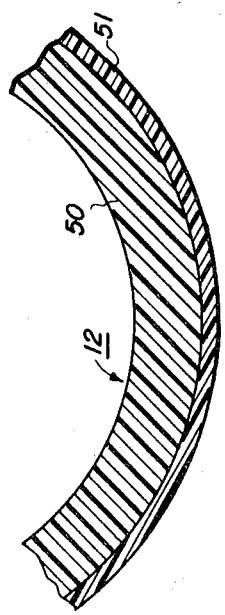
FIG. 5
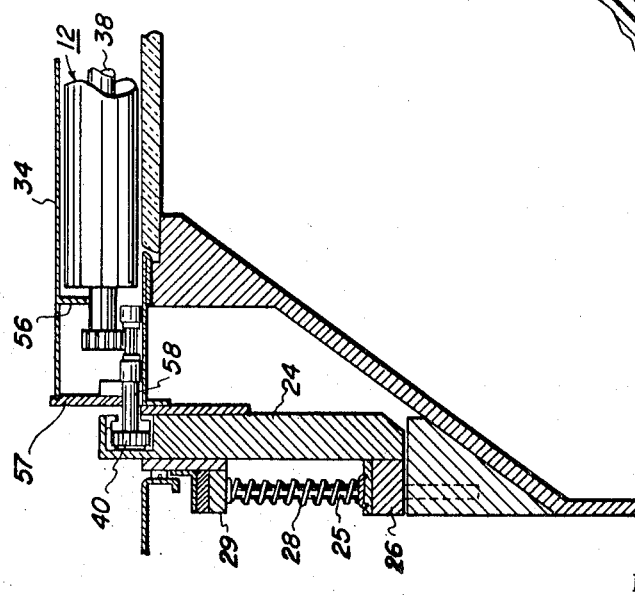
INVENTOR.
HUGH L. JONES
BY
ATTORNEYS Feb. 2, 1971  H. L. JONES  3,560,089
PLATEN COVER Filed July 26, 1968  4 Sheets-Sheet 3

INVENTOR.
HUGH L. JONES
BY
ATTORNEYS

Feb. 2, 1971  H. L. JONES  3,560,089
PLATEN COVER

Filed July 26, 1968  4 Sheets-Sheet 4

INVENTOR.
HUGH L. JONES
BY
ATTORNEYS

United States Patent Office 3,560,089
Patented Feb. 2, 1971

3,560,089
PLATEN COVER
Hugh L. Jones, Rochester, N.Y., assignor to Xerox Corporation, Rochester, N.Y., a corporation of New York
Filed July 26, 1968, Ser. No. 747,906
Int. Cl. G03b 27/62
U.S. Cl. 355—82          3 Claims

ABSTRACT OF THE DISCLOSURE

A cover for a platen employing a pair of curtains which are drawn in succession from rolls over the platen. The first or leading curtain is of a size sufficient to at least cover the transparent portion of the platen when unrolled and consists of a material with inherent self-coiling tendencies. The second or trailing curtain is larger than the first curtain and covers the entire platen area including the first curtain when unrolled. A draw carriage supported for movement across the platen area in a pair of liftable track members is provided. One end of each curtain is attached to the carriage so that drawing of the carriage across the platen area unrolls both curtains in succession onto the platen and any document resting thereon. Where the document is relatively thick, the liftable track members enable the carriage to be raised for passage over the document.

---

This invention relates to a platen cover, and more particularly, to a retractable platen cover.

It is usually desirable to cover the transparent platen surface of document copying or reproduction machines, such as electrostatic copiers and the document being copied during the copying cycle. This is done to assure contact of the entire surface of the document with the platen glass and to prevent movement of the document during the copying process. At the same time, covering the document enhances document illumination while shielding the operator from bothersome glare.

It is a principal object of the present invention to provide a new and improved cover for the platen of a document copying or reproducing machine.

It is a further object of the present invention to provide a roll type curtain cover for the transparent platen of a copying machine, the cover having an inherent self-coiling tendency to facilitate retraction of the cover and uncovering of the platen.

It is an object of the present invention to provide an improved apparatus for covering the transparent platen of a copying machine comprising a light-reflective curtain comprised of inner and outer flexible layers bonded together in shear tension so that the curtain tends to assume a coiled shape.

It is an object of the present invention to provide a self-coiling curtain to cover the platen of a document copying machine having a light reflective surface facing the platen.

This invention relates to a copying apparatus comprising, in combination, a housing; a transparent platen for supporting a document for copying; a carriage; means suporting the carriage for movement across the platen; a self-coiling curtain roll on the carriage, the free end portion of the curtain being secured to the housing whereby movement of the carriage across the platen unrolls the curtain onto the platen against the self-coiling bias of the curtain, the curtain being sized to substantially cover the platen when unrolled; and means to retain the carriage in selected position with the curtain extended, release of the retaining means enabling the carriage to be retracted and the curtain recoiled to uncover the platen.

Other objects and advantages will be apparent from the ensuing description and drawings in which:

FIG. 2 is a front sectional view of the platen cover shown in FIG. 1;

FIG. 5 is an enlarged cross sectional view of the platen cover curtain material.

Figure 1:
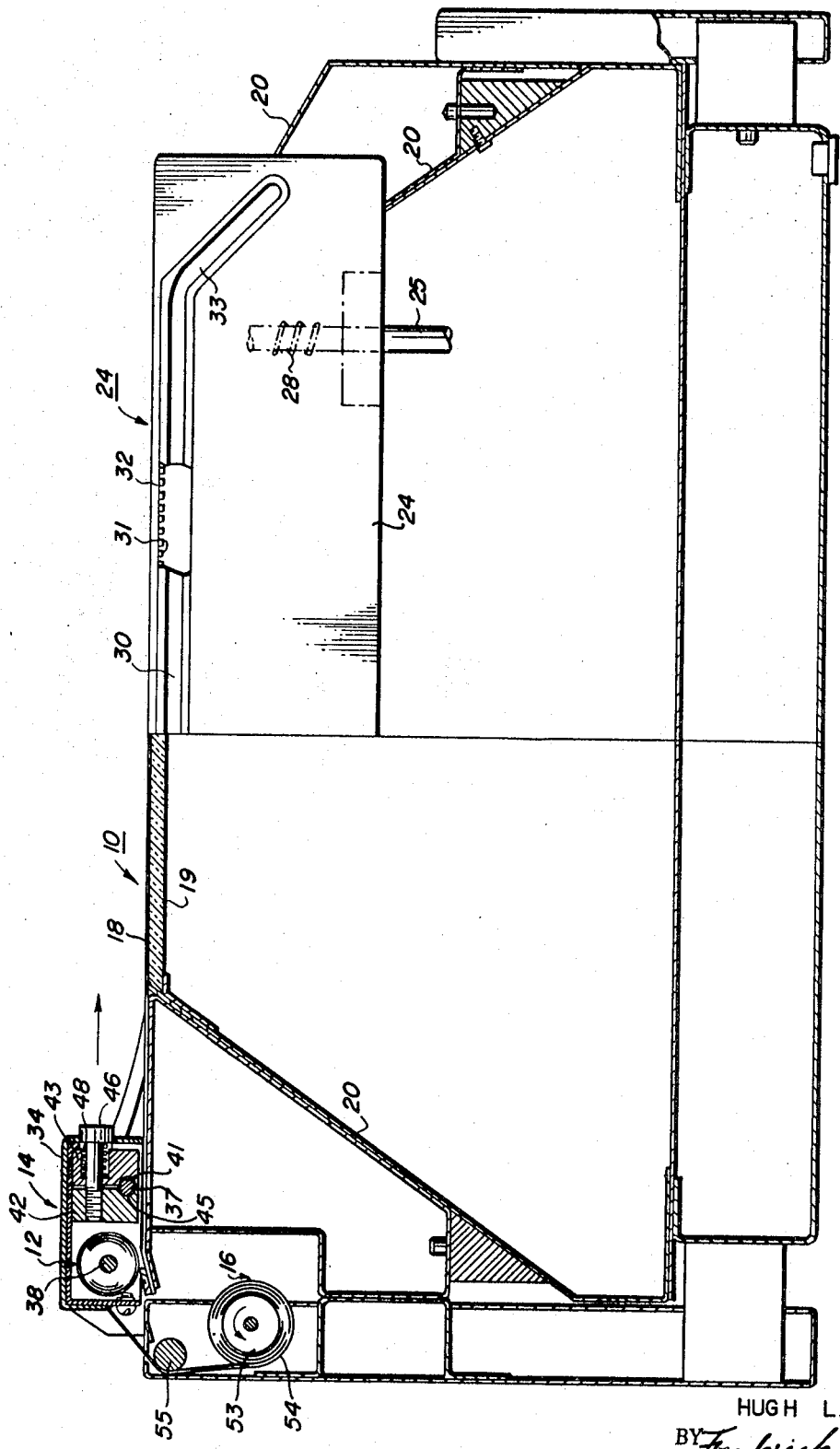
FIG. 1 is a side view in section showing the platen cover of the present invention.

Referring now to the drawings, there is shown the platen cover, designated generally by the numeral 10 of the present invention. As will appear more fully, platen cover 10 is adapted to cover the transparent platen of a document copying or reproducing machine, such as an electrostatic type copier (not shown) and the item, such as a document resting thereon to prevent movement of the document during the copying process and enhance document illumination.

Platen cover 10 includes a carriage 14 movable across the platen surface 18, a first or primary curtain 12, and a trailing second or secondary curtain 16, curtains 12, 16 being adapted to unroll and cover platen surface 18 on movement of carriage 14 thereacross.

Referring particularly to FIGS. 1–4 of the drawings, platen surface 18 includes a transparent glass 19 bounded on three sides by surfaces 21, 22 respectively of frame 20. Platen glass 19, which enables the document being coupled to be viewed by the copying machine (not shown), is normally rectangular in shape although other configurations may be readily contemplated. And while platen glass 19 is shown as being flat, it will be understood that glass 19 may be curved.

As is understood by those skilled in the art, the document to be copied is normally placed face down on platen glass 19, the lower side thereof being illuminated by a suitable light source (not shown) during the copy cycle.

Platen glass 19 is supported by a suitable frame 20. In the exemplary embodiment shown, the upper portion of frame 20 is generally trapezoidal in shape. Boundary surfaces 21, 22, of frame 21 extend outwardly from the sides and rear respectively of glass 19, but slightly below the level of platen glass 19 to facilitate positioning of documents and particularly oversize documents on platen glass 19 and to enable accessory devices such as an automatic document feeder (not shown) to be used. Forward edge 19' of platen glass 19 may be rimless to facilitate sliding documents onto and off of glass 19 and to accommodate foldable documents such as books.

A pair of movable plate-like track members 24 are arranged along the sides of platen glass 19 at the outer extremities of boundary surfaces 21. Members 24 are mounted for up and down movement on rods 25, as by journals 26 secured to the exterior walls thereof. Stops 29 adjacent the top of rods 25 limit upward movement of members 24. Springs 28 bias members 24 downwardly.

Track members 24 slope upwardly adjacent the rear thereof to present a raised portion 27. A generally longitudinal slot-like recess or track 30 with inclined front and rear segments 33, 36, respectively, extends along the interior wall of members 24 adjacent the top edge thereof. Front segment 33 slopes downwardly above the inclined face 20' of platen support frame 20. Rear segment 36 slopes upwardly into raised rear portion 27 of track members 34. The intermediate track segment 23 preferably parallels platen surface 18.

As will appear more fully, rear segment 36, which rises above intermediate segment 23, cooperate with carriage 14 to hold the forward portion of track members 24 on a level with or slightly below the level of platen surface 18 when carriage 14 is retracted. Tracks 30 are provided with gear teeth 31, which may comprise internally toothed inserts 32 suitably secured within tracks 30 as by bonding.

Figure 3:
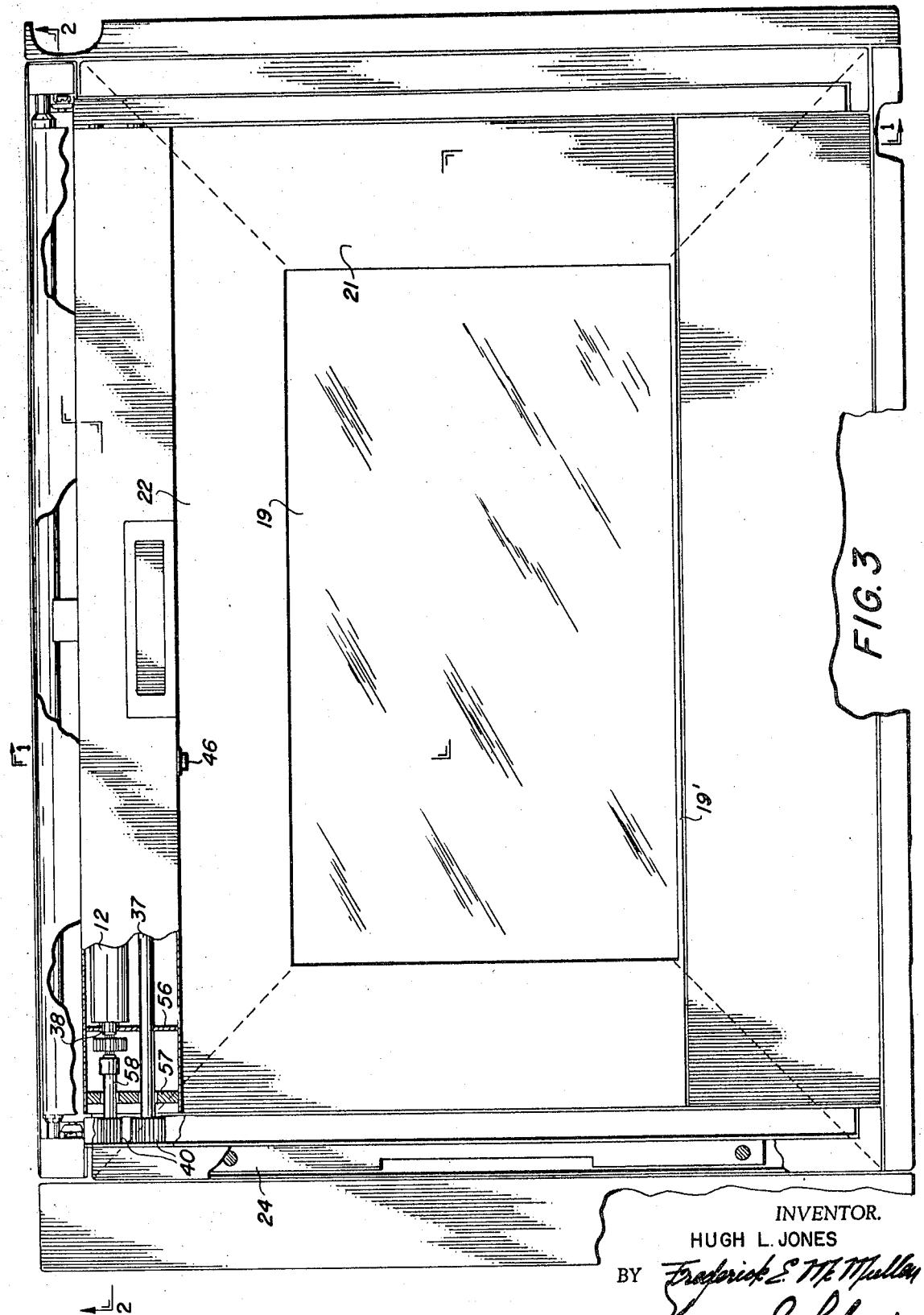
FIG. 3 is a top plan view of the platen cover shown in FIG. 1.
Figure 4:
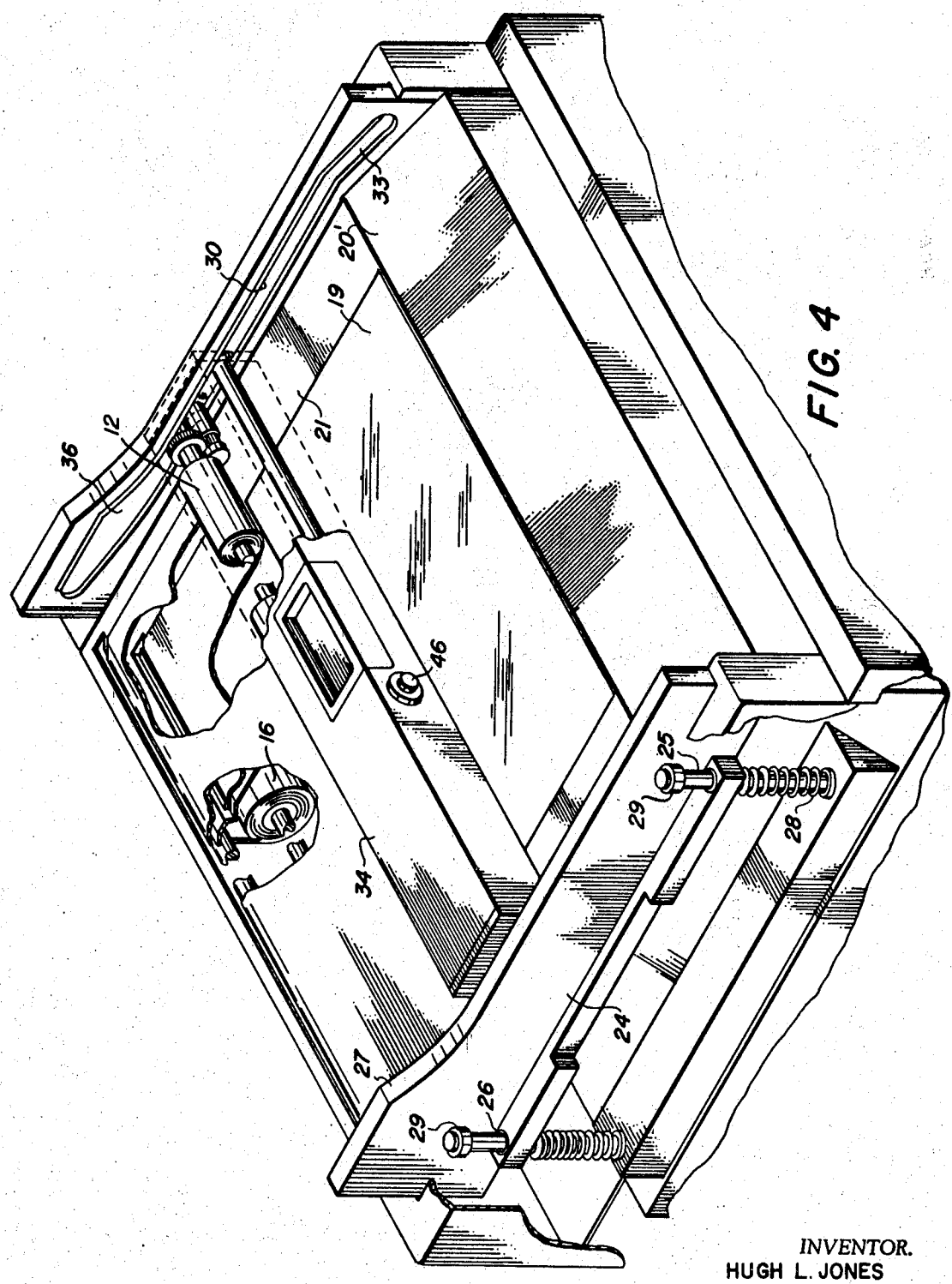
FIG. 4 is an isometric view with the parts broken away illustrating the platen cover of the present invention.

As best seen in FIGS. 1–3 of the drawings, carriage 14 comprises a transverse housing 34, the longitudinal extent of which is slightly less than the distance between track members 24. Housing 34, which has a generally inverted U-shape when viewed in cross section, includes spaced inside and outside end plates 56, 57, respectively. A pair of shafts 37, 38 for supporting carriage 14 and primary curtain 12 respectively, are disposed within carriage housing 34. Shaft 37 is rotatably journaled in outer end plates 57 adjacent the front of carriage housing 34 with the terminal ends thereof projecting into tracks 30. Shaft 38, which is rotatably journaled in inner end plates 56 adjacent the rear of carriage housing 34 at a level adequate to permit primary curtain 12 to freely coil therearound, parallels shaft 37. Stub shafts 58 are rotatably journaled in outer end plates 57 below shaft 38 and adjacent the rear of housing 34, the ends of shafts 58 projecting into tracks 30. The axes of shafts 37, 58 preferably lie in a common plane paralleling platen surface 18. Externally toothed gears 40 are mounted on the outer ends of shafts 37, 58 gears 40 meshing with gear teeth 31 in tracks 30 to support carriage 14 for back and forth movement across platen surface 18. As can be understood, the spaced relationship of shafts 37, 58 with one another combines with the interengagement of gears 40 with gear teeth 31 to assure movement of carriage 14 in a straight line without cocking or twisting thereof.

Shaft 37 is preferably roughened as by knurling at 41. A pair of relatively movable gripper or brake elements 42, 43 are arranged on opposite sides of shaft 37. Brake element 42 has a semi-circular braking surface 45 engageable with knurled portion 41 of shaft 37. Brake control 46, which may be secured to element 42, projects through element 43 and front wall 34' of carriage housing 34. Compression spring 48 disposed between control 46 and element 43, biases brake element 42 into gripping engagement with knurled portion 41 of shaft 37 to prevent rotation of shaft 37 and movement of carriage 14.

Primary curtain 12 is normally in roll form and supported in carriage 34 on shaft 38. The free end of curtain 12 is suitably fixed to frame 20 adjacent rear boundary surface 22. The width of curtain 12 is at least equal to and preferably somewhat greater than the dimension between side boundary surfaces 21 whereby curtain 12 may cover the platen glass 19 and any document resting thereon when unrolled. Primary curtain 12 is comprised of a material that is inherently self-coiling and has suitable photo-electric light reflective properties.

Referring to FIG. 5 of the drawings, curtain 12 is preferably fabricated from a supporting or base layer 50 of flexible plastic having bonded to the lower surface thereof a second layer 51 such that the layers 50, 51 are in shear tension relative to one another tending to cause the curtain 12 to assume a coil shape. Inner layer 51 is comprised of a suitable flexible plastic material having desired photo-electric light reflective properties such as white plastic. Alternately, the inside surface of layer 51 may be coated with a suitable light reflective substance.

It is understood that outer layer 50 may, in the alternative comprise one or more individual strip like portions. It is understood that the inherent self-coiling bias of primary curtain 12 tends to retract carriage 14 and uncover platen glass 19.

Referring especially to FIGS. 1 and 2 of the drawings, secondary curtain 16 includes supporting roller 53 mounted on frame 20 behind carriage 14 and below platen surface 18. A length of suitable curtain material 54 is wrapped around roller 53. Suitable torsion spring means (not shown) biases roller 53 in a counterclockwise direction as shown by the solid line arrow in FIG. 1 of the drawings.

The free end of curtain 54 is attached to rear of carriage 14. To facilitate movement of curtain 16 onto platen surface 18, a transfer roller 55 is journaled on frame 20 between secondary curtain roller 53 and carriage 14.

The width of secondary curtain 16 is at least equal to and preferably slightly greater than the distance between track members 24 to assure complete covering of platen surface 18 and primary curtain 12 upon unwinding of secondary curtain 16. The exterior surface of curtain 16 may have a suitable decorative finish to enhance the aesthetic appearance of platen cover 10 when covering platen surface 18.

The curtain material for secondary curtain 16 may comprise an inherently self-coiling material of the type described heretofore in conjunction with primary curtain 12. In that event, the layers 50, 51 are reversed bas layer 50 forming the inside surface of the secondary curtain with the light reflective layer 51, which may instead have a suitable decorative coating thereon, on the outside. Where secondary curtain 14 is comprised of an inherently self-coiling material, support roller 53 is preferably replaced by a supporting shaft about which the roll of self-coiling curtain material is disposed.

Carriage 14, under the self-coiling bias of curtains 12, 16 is normally in a retracted position on rear platen boundary surface 22. Primary and secondary curtains 12, 16, respectively, are substantially rolled up and platen glass 19 uncovered. Gears 40 of carriage support shafts 37, 58 which are disposed within rear track segments 36 maintain the forward portion of track members 24 at or slightly below the level of platen surface 18. This enables items such as large size documents or rigid documents to be placed on platen surface 18.

Following positioning of the item to be copied, such as a document, on platen glass 19, brake control 46 is depressed against the bias of spring 48 to release braking element 42 and free shaft 37 for rotation. This permits carriage 14 to be drawn or pulled forward (in the direction of the solid line arrow in FIG. 1). As carriage 14 moves forward across platen surface 18, primary curtain 12 unrolls over platen glass 19 and the document resting thereon. At the same time, the trailing secondary curtain 16 is pulled over primary curtain 12 and platen surface 18.

On initial forward movement of carriage 14, gears 40 on shafts 37, 58 move along downwardly inclined track segments 36 and into intermediate track segments 33. Movement of gears 40 through track segments 36 forceably raises track members 24 upwardly against the bias of springs 28. Where the item being copied is relatively thin, such as single page document, track members 24 are raised the relatively short distance above the level of platen surface 18 necessary to expose tracks 30 and enable carriage 14 to be moved across the platen surface 18. Where the item to be copied on platen glass is relatively thick, such as a book carriage 14 and track members 24 are raised upwardly to a height required for carriage 14 to pass thereover and unroll curtains 12, 16, over the item being copied. It is understood that stops 29 prevent track members 24 from being lifted off of supporting rods 25.

The forward movement of carriage 14 in tracks 30 unrolls curtains 12, 16 over the platen surface 18, covering platen glass 19 and the item being copied. Brake control 46 when released, permits brake element 42 to grippingly engage knurled portion 41 of shaft 37 and hold carriage 14 in selected position with curtains 12, 16 covering platen surface 18.

In instances where a foldable item such as a book is being copied and the page to be copied rests face down on platen glass 19 with a portion of the item resting on face 20' of support frame 20, the downward movement of carriage 14 in forward track segments 33 aids in retaining the item in place on platen glass 19 and assures complete covering thereof by curtains 12, 16.

When copying is completed, brake control 46 is depressed to disengage brake element 42 and free shaft 37 for rotation. The self-coiling bias of curtains 12, 16 aids in retracting carriage 14 to uncover the platen surface 18 and permit the item copied to be removed. On retraction of carriage 14, movement of support shafts 37, 58 upwardly through sloping segment 36 of tracks 30 depresses track members 24 to carry the forward portion thereof to the level of or slightly below platen surface 18 to facilitate removal and/or addition of the next item to be copied.

According to the preferred form of the invention, the self-coiling bias of primary and secondary curtains 12, 16 respectively is not ordinarily sufficient of itself to retract carriage 14. A slight pushing effort by the user is required to retract the carriage and uncover the platen. This construction reduces the force required of the user to draw carriage 14 forward and unroll curtains 12, 16. It is appreciated however that platen cover 10 may be constructed so that the return bias exercised by curtains 12, 16 is sufficient of itself, when brake control 46 is released, to retract carriage 14 and uncover the platen.

While I have described and illustrated herein a preferred form of my invention, it will be apparent to those skilled in the art that changes and modifications may be made thereto without departing from the spirit and intent of my invention which is to be limited only to the scope of the appended claims.

What is claimed is:

1. In a copying apparatus including a housing and a transparent platen for supporting a document for copying, the combination of:

a carriage, means supporting said carriage for movement across said platen, a self-coiling curtain roll on said carriage, the free end portion of said curtain being secured to said housing whereby movement of said carriage across said platen unrolls said curtain onto said platen against the self-coiling bias of said curtain, said curtain being sized to substantially cover said platen when unrolled; and, means to retain said carriage in selected position with said curtain extended, release of said retaining means enabling said carriage to be retracted and said curtain recoiled to uncover said platen.

2. The apparatus according to claim 1 in which said curtain comprises inner and outer layers of flexible material, said inner layer material being light reflective said outer layer material being bonded to the outside of said inner layer material such that shear tension is established between the inner and outer layers tending to cause said curtain to assume a coil shape.

3. The apparatus according to claim 1 in which the surface of said curtain opposite said platen is light reflective.

References Cited
UNITED STATES PATENTS

| | | | |
|---|---|---|---|
| 2,438,225 | 3/1948 | Martin | 355—78 |
| 3,064,546 | 11/1962 | Hutchins | 355—99 |
| 3,451,752 | 6/1969 | Frank | 355—8 |

JOHN M. HORAN, Primary Examiner

M. HARRIS, Assistant Examiner

U.S. Cl. X.R.

355—91, 99, 133